United States Patent
Viala et al.

(10) Patent No.: US 11,345,215 B2
(45) Date of Patent: May 31, 2022

(54) VEHICLES AND METHODS FOR COOLING A CABIN USING A COLD ROOF

(71) Applicant: Bayerische Motoren Werke Aktiengesellschaft, Munich (DE)

(72) Inventors: Pascal Viala, Mountain View, CA (US); Isaac Lund, Salinas, CA (US); Simon Lux, Mountain View, CA (US); Michelle Bogen, Mountain View, CA (US); Ann-Christin Gentschev, Belmont, CA (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 274 days.

(21) Appl. No.: 15/941,438

(22) Filed: Mar. 30, 2018

(65) Prior Publication Data
US 2019/0299748 A1  Oct. 3, 2019

(51) Int. Cl.
*B60H 1/00* (2006.01)
*B60H 1/26* (2006.01)

(52) U.S. Cl.
CPC .................. *B60H 1/262* (2013.01)

(58) Field of Classification Search
CPC .......... B60H 1/262; B60H 1/245; B60H 2001/00235; B60H 1/24; B60H 1/26; B60H 1/265; B60H 1/267; B60H 1/34; B60H 1/00371; B60H 1/32; B60H 2001/003; B60H 1/00821; B60H 1/00828; B60H 1/00835; B60H 1/00842; B60H 1/00849;
(Continued)

(56) References Cited

U.S. PATENT DOCUMENTS

| 1,483,290 A | * | 2/1924 | Eggimann | B60H 1/262 |
| | | | | 454/138 |
| 1,862,058 A | * | 6/1932 | Lintern | B60H 1/247 |
| | | | | 454/137 |
| 2003/0193217 A1 | * | 10/2003 | Hesch | B60J 5/042 |
| | | | | 296/208 |

(Continued)

FOREIGN PATENT DOCUMENTS

| CN | 204870497 U | * | 12/2015 | ............... B60J 1/32 |
| DE | 4207283 A1 | * | 9/1993 | .............. F25B 21/02 |

(Continued)

OTHER PUBLICATIONS

"Machine Translation of DE 4207283 A1". 2020.*
(Continued)

*Primary Examiner* — Michael G Hoang
*Assistant Examiner* — Mark P Yost
(74) *Attorney, Agent, or Firm* — Crowell & Moring LLP

(57) ABSTRACT

Vehicles and methods for cooling a cabin using a cold roof of the vehicle are provided. The vehicle includes a roof, a cabin, and an insulation layer disposed between the roof and the cabin. The vehicle also includes a passage that fluidly couples the roof with the cabin. The passage is switchable between an open mode and a closed mode. The passage is switched between the open mode and the closed mode depending on a relationship between a roof temperature, a cabin temperature, and/or a threshold temperature. The passage may be formed through the insulation layer or extend outside of the insulation layer fluidly coupling the roof with the cabin.

6 Claims, 15 Drawing Sheets

(When Tr ≥ Tc)

(When Tr < Tc and Tc ≥ Tth)

(58) Field of Classification Search
CPC ... B60H 1/00857; B60H 1/00864; F24D 5/04; B60J 7/16; B60J 7/1635
USPC .......................................... 454/75, 137, 136
See application file for complete search history.

(56) References Cited

U.S. PATENT DOCUMENTS

| | | | | |
|---|---|---|---|---|
| 2009/0266000 | A1* | 10/2009 | Minoura | B60J 10/24 49/490.1 |
| 2010/0167636 | A1* | 7/2010 | Bhattacharya | H05K 5/0213 454/239 |
| 2012/0282853 | A1* | 11/2012 | Sinur | F24F 13/1426 454/238 |

FOREIGN PATENT DOCUMENTS

| | | | | |
|---|---|---|---|---|
| GB | 2529315 A | * | 2/2016 | ........... F24D 19/109 |
| JP | 59223511 A | * | 12/1984 | ............. B60H 1/248 |
| JP | 2012121398 A | * | 6/2012 | ............... B60H 1/00 |

OTHER PUBLICATIONS

"Machine Translation of JPS59223511". 2020.*
Machine Translation of Borrmann (Year: 1993).*
Machine Translation of Borrmann (DE 4207283 A1) (Year: 1993).*
Machine Translation of Adachi (JP 2012121398 A) (Year: 2012).*
Machine Translation of Gu (CN 204870497 U) (Year: 2015).*

* cited by examiner (When Tr ≥ Tc)

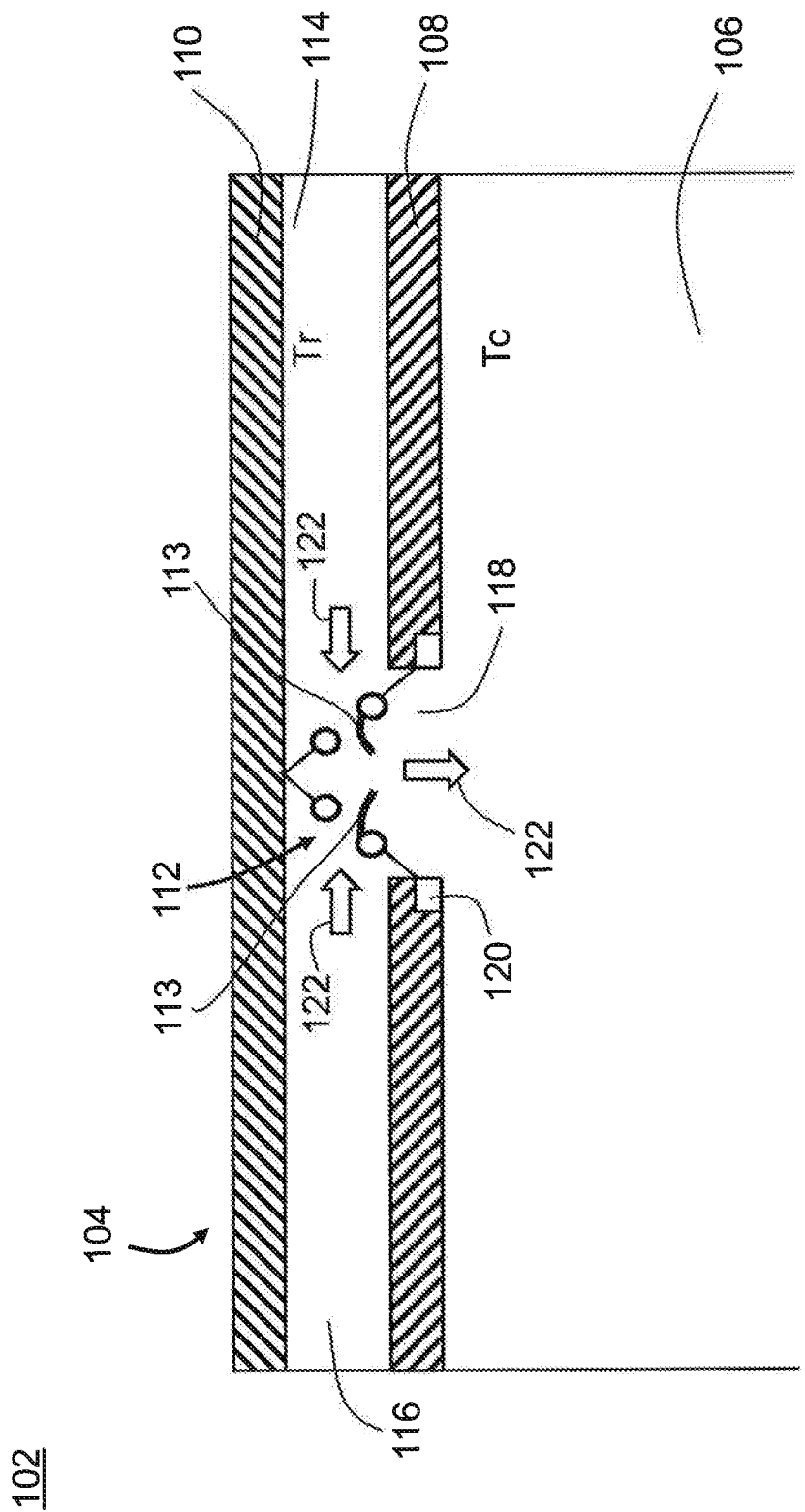

(When Tr < Tc and Tc < Tth)

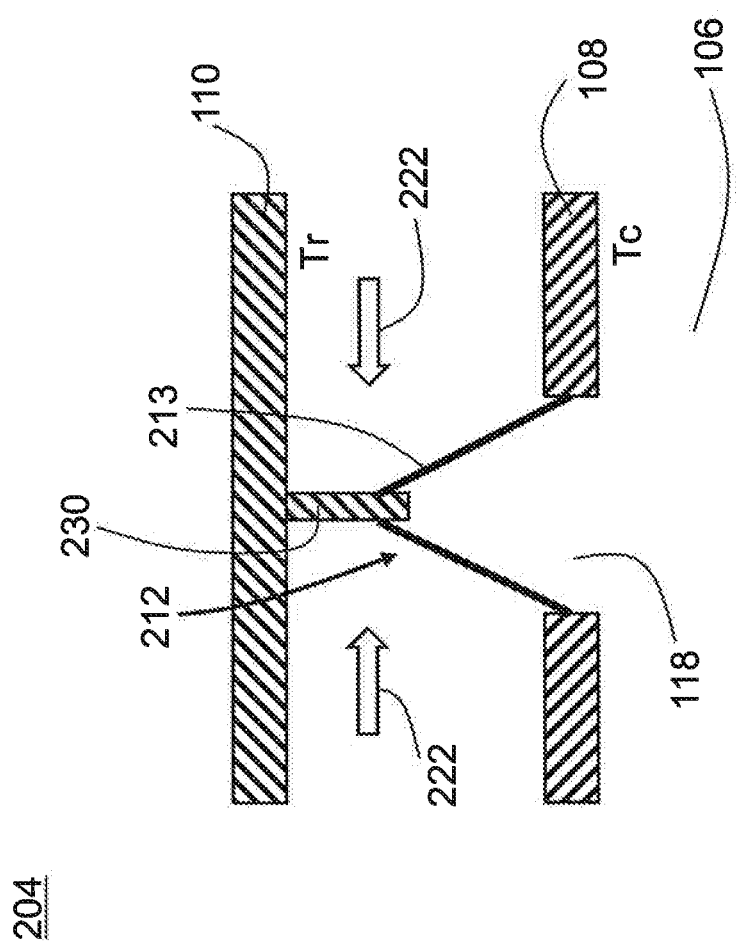

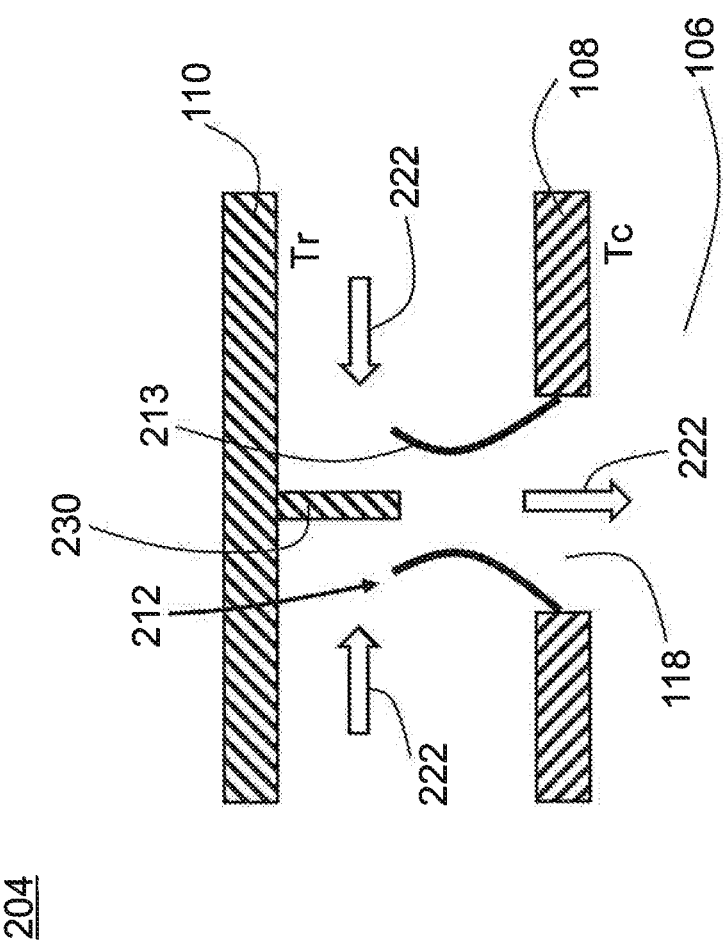

(When Tc < Tth)

(When Tc ≥ Tth)

(When Tc ≥ Tth)

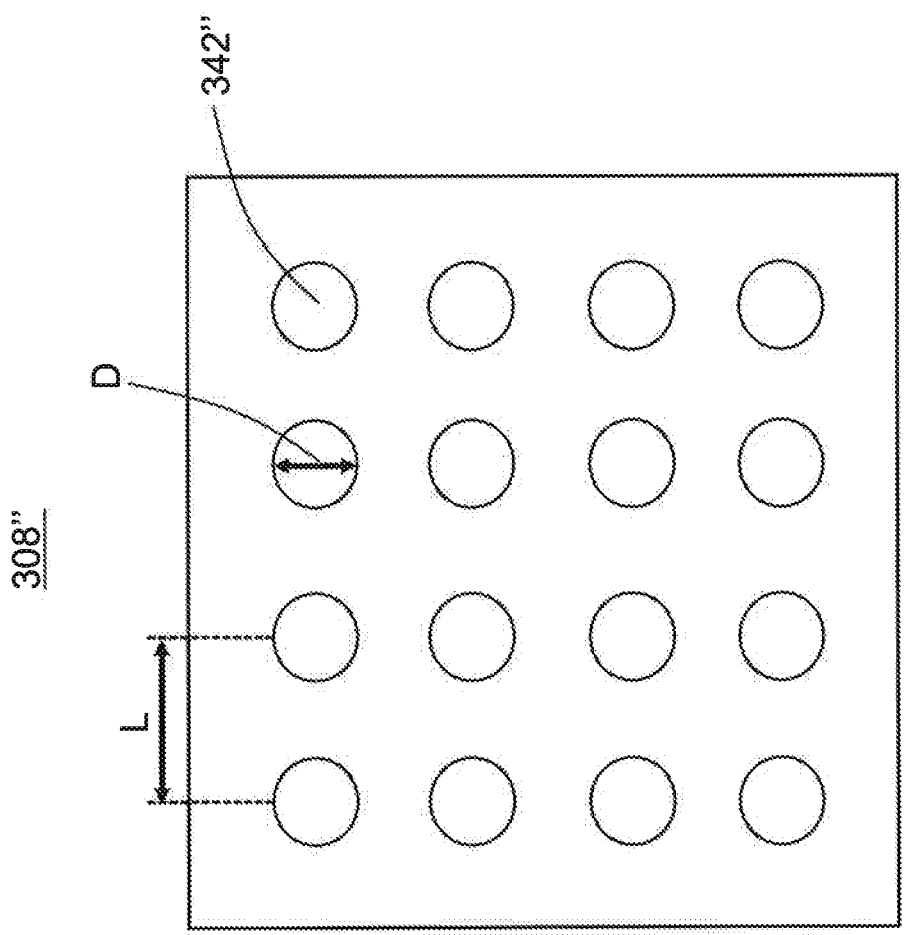

(When Tr < Tc and Tc ≥ Tth)

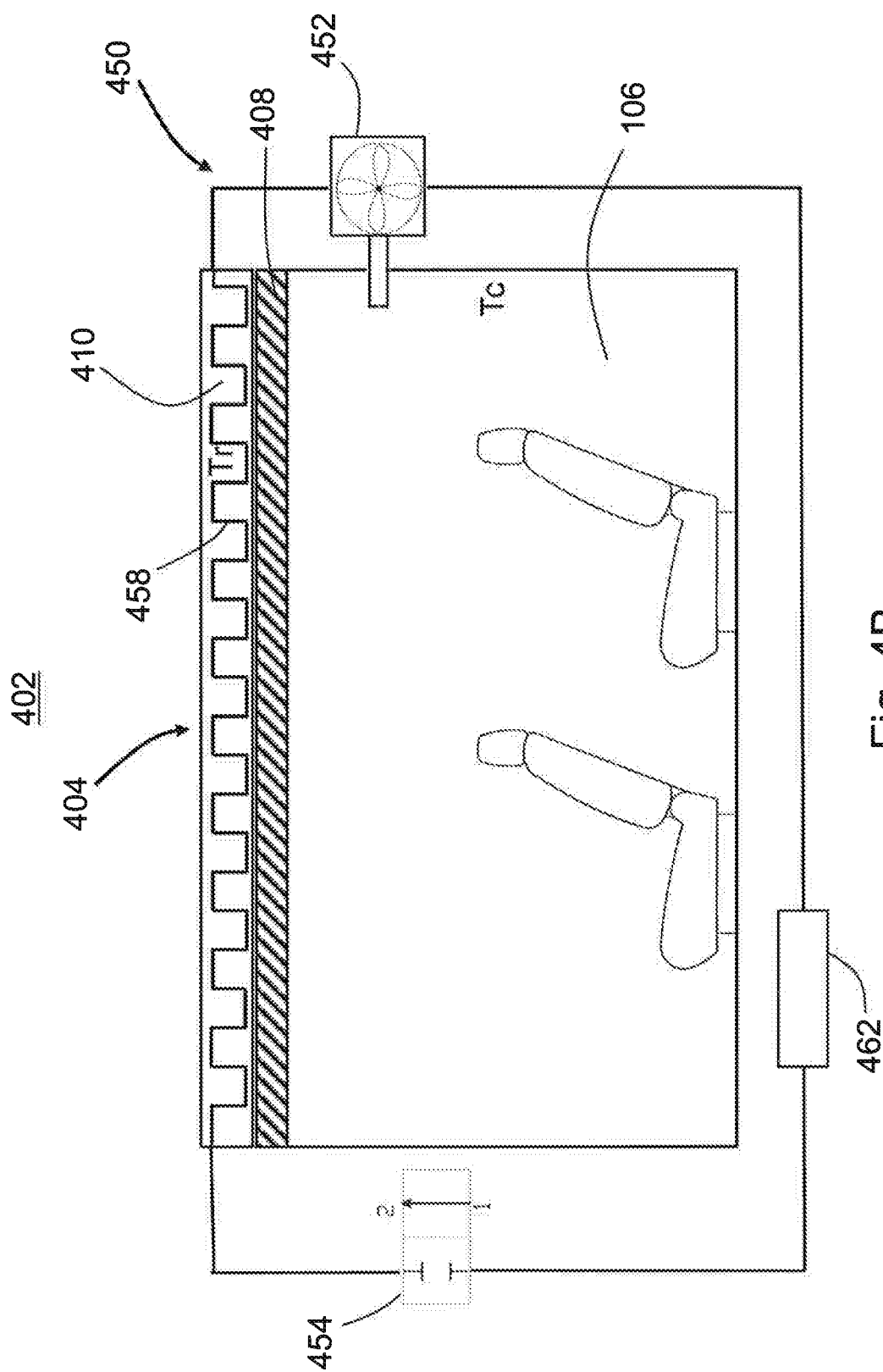

VEHICLES AND METHODS FOR COOLING A CABIN USING A COLD ROOF

BACKGROUND AND SUMMARY OF THE INVENTION

The present application relates to vehicles and methods for cooling a cabin using a cold roof of the vehicle.

In a conventional vehicle roof, an insulation layer is disposed between a roof and a cabin, and insulates a cabin from the surface of the roof. Normally, such a configuration of the insulation layer is permanently fixed to the roof regardless of the temperature of the roof or the cabin.

FIG. 6 is a schematic view of a vehicular cabin 1006 in a conventional vehicle 1002 as disclosed in the prior art. The vehicle 1002 includes a roof 1010. To insulate the cabin 1006 from the roof 1010, an insulation layer 1008 is provided between the cabin 1006 and the roof 1010. The insulation layer 1008 is permanently fixed to the roof 1010 or other structure of the vehicle 1002, and the cabin 1006 is permanently insulated from the roof 1010 via the insulation layer 1008.

However, under certain circumstances, the vehicular roof (or the roof surface) can be cooler than the cabin such that the cooler roof may be used to cool down the cabin. For example, in winter, the roof can be naturally cooler than the cabin. Specifically, the air temperature outside the vehicle may be lower than the air temperature inside the cabin, which can result in the roof temperature being lower than the cabin temperature. For another example, the vehicular roof may be cooled down by applying one or more cooling technologies in certain circumstances. Regardless of the reason, such a cooler roof 1010 is simply insulated from the cabin 1006 using the insulation layer 1008 in the conventional vehicle 1002 as illustrated in FIG. 6.

While removing an insulation layer from a vehicle may be a direct way to utilize the cooler roof (or the cooler roof surface), the permanent removal of the insulation layer would not be desirable because the driver and/or passenger(s) may feel uncomfortable when the cabin temperature becomes below a certain temperature (e.g., 18° C.), thus heat needs to be maintained in the cabin once again.

In view of this background, it is an objective of the present invention to provide new vehicles and methods that enable cooling a vehicular cabin using a cold roof of the vehicle while providing needed insulation between the cabin and the roof. This and other objects are achieved by cabin cooling systems of vehicles and methods of operating such cabin cooling systems in accordance with embodiments of the invention.

In accordance with one aspect of the present invention, a vehicle includes a roof, a cabin, and an insulation layer disposed between the roof and the cabin. The vehicle includes a passage that fluidly couples the roof with the cabin. The passage is switchable between an open mode and a closed mode. The passage may be switched between the open mode and the closed mode depending on a relationship between a roof temperature, a cabin temperature, and/or a threshold temperature.

According to an exemplary embodiment, the passage may be formed at least in part through the insulation layer. Further, the passage may be formed at least in part by a bi-metal or tri-metal switch. The bi-metal or tri-metal switch may operate based on comparison between the roof temperature and the cabin temperature. Alternatively, the passage may be formed at least in part by a porous material with a negative coefficient of thermal expansion.

According to another exemplary embodiment, the passage may extend outside of the insulation layer fluidly coupling the roof with the cabin. The passage may be part of a cooling circuit which runs at least in part through or on the roof.

In accordance with another aspect of the present invention, a method is provided for cooling a cabin of a vehicle using a cold temperature of a roof, wherein an insulation layer is arranged between the roof and the cabin. The method may include fluidly coupling the roof with the cabin via a passage switchable between an open mode and a closed mode; and switching the passage between the open mode and the closed mode depending on a relationship between a roof temperature, a cabin temperature, and/or a threshold temperature.

According to an exemplary embodiment, switching the passage between the open mode and the closed mode may be by way of a bi-metal or tri-metal switch. Alternatively, switching may be by way of the insulation layer at least in part made of a porous material with a negative coefficient of thermal expansion, or by way of a cooling circuit which runs at least in part through or on the roof.

Other objects, advantages and novel features of the present invention will become apparent from the following detailed description of the invention when considered in conjunction with the accompanying drawings.

BRIEF DESCRIPTION OF THE DRAWINGS

FIG. 1B is a schematic view of the cabin cooling system when the roof temperature is lower than the cabin temperature with the cabin temperature being equal to or higher than a threshold temperature.

FIG. 2B is a schematic side-sectional view of a cabin cooling system when the bi-metal switch is in a closed position.

FIG. 2C is a schematic side-sectional view of the cabin cooling system when the bi-metal switch is in an open position.

FIG. 3E is a top view of an exemplary insulation layer in accordance with the second exemplary embodiment of the present invention.

FIG. 4B is a schematic view of the cabin cooling system including the cooling circuit when the roof temperature is equal to or higher than the cabin temperature, or the cabin temperature is lower than the threshold temperature.

DETAILED DESCRIPTION OF DRAWINGS

Figure 1A:
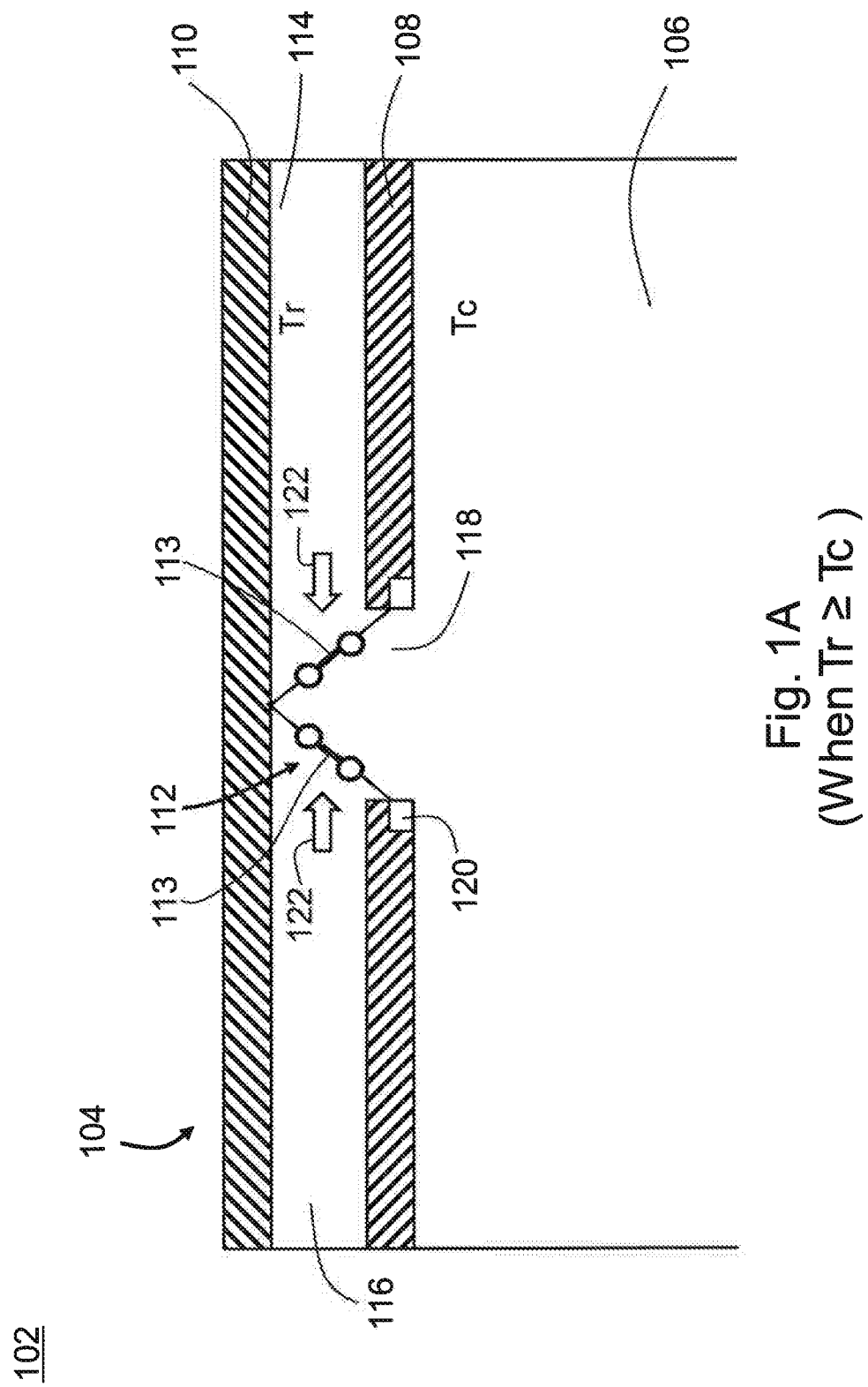
FIG. 1A is a schematic view of a cabin cooling system when a roof temperature is equal to or higher than a cabin temperature in accordance with a first exemplary embodiment of the present invention.
Figure 1C:
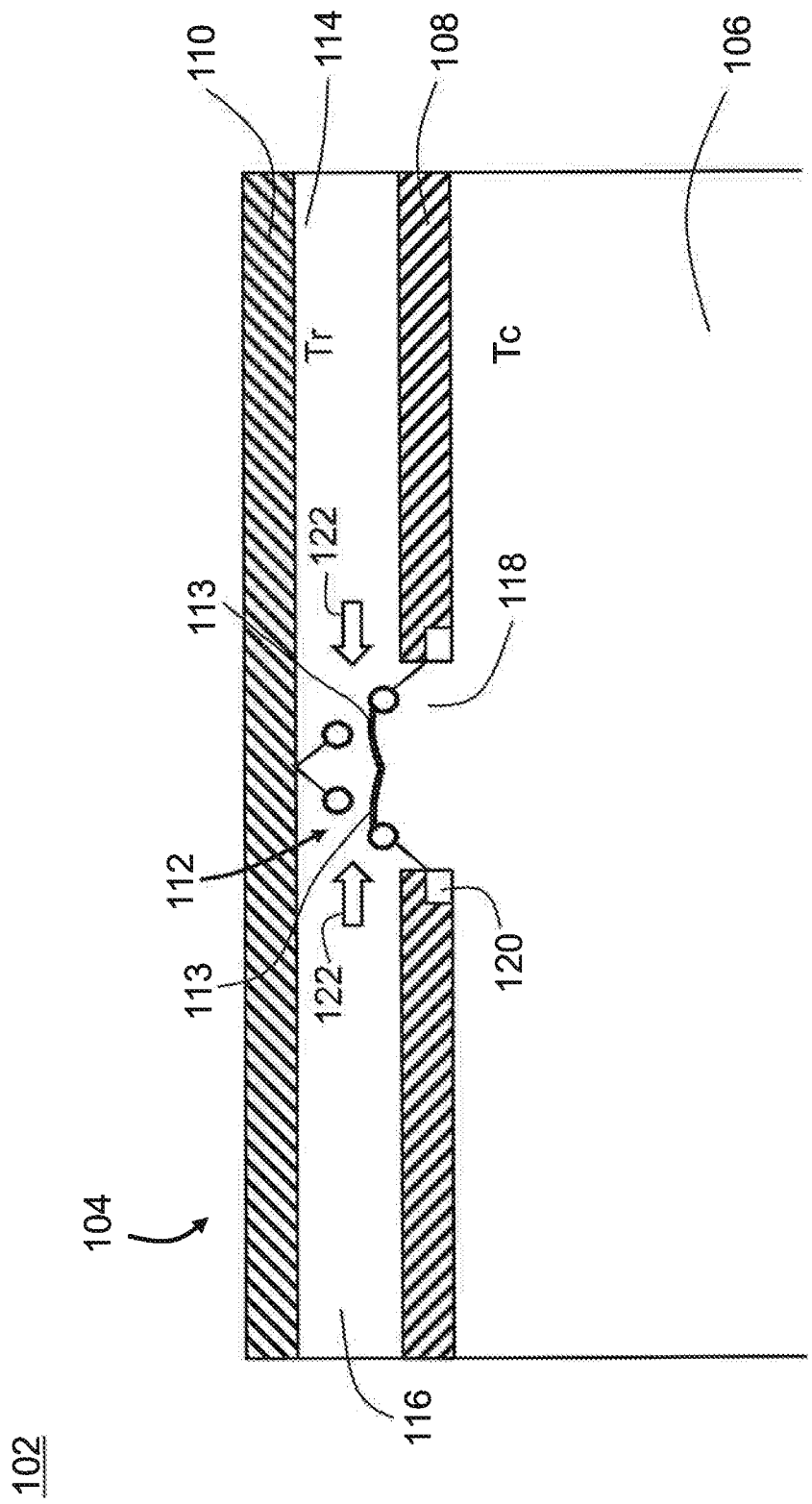
FIG. 1C is a schematic view of the cabin cooling system when the roof temperature is lower than the cabin temperature, but with the cabin temperature being lower than the threshold temperature.

FIGS. 1A-1C schematically illustrate a cabin cooling system 104 of a vehicle 102 using a cold vehicular roof 110 in accordance with a first exemplary embodiment of the present invention. Here, a "cold" roof means that the roof is relatively cooler than the cabin, or the roof temperature Tr is lower than the cabin temperature Tc. The roof temperature Tr or the cabin temperature Tc may be measured via, e.g., a sensor such as a temperature sensor (not shown).

FIGS. 1A-1C are enlarged views of the cabin cooling system 104 showing a thermal switch, preferably a bi-metal or tri-metal switch. In particular, FIG. 1A illustrates a cabin cooling system 104 of a vehicle 102 including a bi-metal or tri-metal switch 112 when a roof temperature Tr is equal to or higher than a cabin temperature Tc (i.e., Tr≥Tc). On the other hand, FIG. 1B illustrates the cabin cooling system 104 when the roof temperature Tr is lower than the cabin temperature Tc (i.e., Tr<Tc), with the cabin temperature Tc being equal to or higher than a threshold temperature Tth (i.e., Tc≥Tth). The roof temperature Tr may be measured on or inside the roof 110. Alternatively, the roof temperature Tr may be measured at a location 114 near or immediately beneath the roof 110. The cabin temperature Tc may be measured at a location inside the cabin 106. Alternatively, the cabin temperature Tc may be measured on a ceiling, a wall, or a bottom of the cabin 106.

Underneath the roof 110 is disposed an insulation layer 108 which functions as a barrier between the side of the roof 110 and the side of the cabin 106 to prevent or reduce heat transfer therebetween. A gap 116 is present between the roof 110 and the insulation layer 108 in the embodiment shown in FIGS. 1A-1C. However, it is also contemplated that no gap may be present in other embodiments.

As discussed above, the cabin cooling system 104 preferably utilizes a bi-metal or tri-metal switch 112 that is disposed at a discontinuity 118 of the insulation layer 108. The switch 112 may include a thermal conductor 120 made of e.g., a metal. Bi-metal refers to an object that is composed of two separate metals joined together. Instead of being a mixture of two or more metals, like alloys, a bi-metallic object includes layers of different metals. Tri-metal refers to an object composed of three or more metals. Bi-metallic or tri-metallic strips convert a temperature change into mechanical displacement. Various types of bi-metal or tri-metal switches and their operations are known to those skilled in the art, and thus detailed descriptions are omitted for brevity.

Unlike an insulation layer in a conventional vehicle, the insulation layer 108 of FIGS. 1A-1B has a discontinuity 118 through which a passage 122 (as indicated with arrows) is formed. The passage 122 is formed at least in part by the switch 112 and is switchable, via the switch 112, between an open mode (shown in FIG. 19) and a closed mode (shown in FIG. 1A). The passage 122 fluidly couples the roof 110 with the cabin 106 when the switch 112 is open (shown in FIG. 1B). As a result, cooled air due to the cold roof 110 can travel into the cabin 106 cooling down the cabin temperature Tc. In this way, heat transfer occurs between the roof 110 and the cabin 106.

Preferably, the switch 112 includes bi-metallic or tri-metallic strips or planar members 113 that convert a temperature change into mechanical displacement. The bi-metal or tri-metal switch 112 is configured such that the switch 112 operates based on comparison between the roof temperature Tr and the cabin temperature Tc. Specifically, when the roof temperature Tr becomes equal to or higher than the cabin temperature Tc (i.e., Tr≥Tc) as shown in FIG. 1A, the switch 112 is switched to a closed position and the passage 122 is switched to the closed mode. On the other hand, when the roof temperature Tr becomes lower than the cabin temperature Tc (i.e., Tr<Tc), with the cabin temperature Tc being equal to or higher than a threshold temperature Tth (i.e., Tc≥Tth) as shown in FIG. 1B, the switch 112 is switched to an open position by way of bending of the bi-metallic or tri-metallic strips or planar members 113, and the passage 122 is switched to the open mode. Here, the threshold temperature Tth may be, e.g., 18° C., for below which temperature, insulation of the cabin 106 from the roof 110 may be needed to improve comfort for the driver and/or passengers.

FIG. 1C illustrates the cabin cooling system 104 when the roof temperature Tr is lower than the cabin temperature Tc (i.e., Tr<Tc), but with the cabin temperature Tc being lower than a threshold temperature Tth (i.e., Tc<Tth). Again, the threshold temperature Tth may be, e.g., 18° C. In this case, even though the roof temperature Tr is lower than the cabin temperature Tc (i.e., Tr<Tc), the current cabin temperature Tc is considered too low so that insulation between the roof 110 and the cabin 106 is needed to avoid discomfort the driver and/or passengers may feel. Therefore, the switch 112 is switched to a closed position by way of bending of the bi-metallic or tri-metallic strips or planar members 113, and the passage 122 is switched to the closed mode as shown in FIG. 1C. By use of the above-discussed cabin cooling system 104, the cold roof 104 can be utilized to cool down the cabin 106 while maintaining the driver's and/or passengers' comfort in cold weather, for example.

Figure 2A:
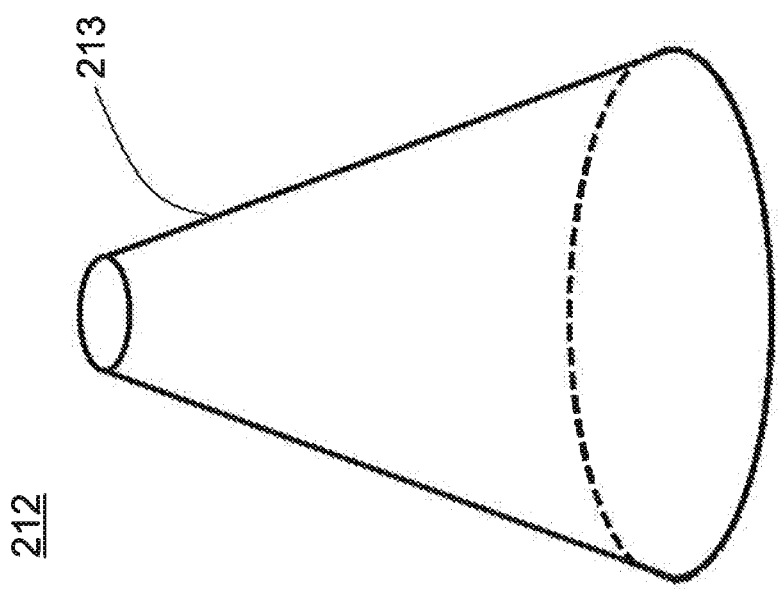
FIG. 2A is a schematic view of an exemplary bi-metal switch having a shape of hollow conical frustum.

FIGS. 2A-2C schematically illustrate an exemplary switch 212 in accordance with the first exemplary embodiment of the present invention. FIG. 2A schematically shows an exemplary bi-metal switch 212 having a body of a shape of a hollow conical frustum (i.e., a hollow cone with the top cut off). The bi-metal switch 212 may include bi-metal planar members 213 that convert a temperature change into mechanical displacement.

FIG. 2B schematically shows a side-sectional view of a cabin cooling system 204 when the switch 212 is installed at a discontinuity 118 of an insulation layer 108 in a vehicle. In particular, FIG. 2B shows a view when the switch 212 is in a closed position (i.e., when a roof temperature Tr is equal to or higher than a cabin temperature Tc (i.e., Tr≥Tc)), thus a passage 222 (as indicated with arrows) is in a closed mode. The cabin cooling system 204 preferably includes a stopper 230 that projects downward into a top open end of the bi-metal switch 212. The stopper 230 may include a body of cylindrical shape and be fixedly attached to a structure (e.g., roof 110) of the vehicle. The stopper may be made of, for example, a rubber material.

In the closed position of the switch 212, the bi-metal planar members 213 of the switch 212 are preferably in contact with the stopper 230, thereby the switch 212 closes and seals the air gap between the switch 212 and the stopper 230. The switch 212 may be designed such that when the cabin temperature Tc or the roof temperature Tr is within a predefined temperature range (e.g., Tr<18° C.), the switch is bent or moved toward and compressing the stopper 230 (e.g., rubber stopper). In this way, sealing between the switch 212 and the rubber stopper 230 can be improved.

FIG. 2C shows a view of the cabin cooling system 204 when the switch 212 is in an open position (i.e., when the roof temperature Tr is lower than the cabin temperature Tc (i.e., Tr<Tc), with the cabin temperature Tc being equal to or higher than a threshold temperature Tth (i.e., Tc≥Tth)), thus the passage 222 (as indicated with arrows) is in an open mode. As illustrated in FIG. 2C, the switch 112 may be switched to the open position by way of bending of the bi-metal planar members 213. Here, the threshold temperature Tth may be, e.g., 18° C., for below which temperature, insulation of the cabin 106 from the roof 110 is needed to improve comfort for the driver and/or passengers.

As described above referring to FIG. 1C, when the roof temperature Tr is lower than the cabin temperature Tc (i.e., Tr<Tc), but with the cabin temperature Tc being lower than a threshold temperature Tth (i.e., Tc<Tth (e.g., 18° C.)), the current cabin temperature Tc is considered too low so that insulation between the roof 110 and the cabin 106 is needed to avoid discomfort the driver and/or passengers may feel. This can be achieved, for example, by a selective design of the bi-metal planar members 213 of the switch 212. Alternatively, it is contemplated that an additional stopper (not shown) may be employed to provide the insulation between the roof 110 and the cabin 106.

According to the first exemplary embodiment of the present invention, a passage fluidly coupling the vehicular roof with the cabin is formed at least in part by a thermal switch (e.g., a bi-metal or tri-metal switch). While bi-metal planar members 213 of hollow conical frustum shape are used in the embodiment shown in FIGS. 2A-2C, the design or shape of the bi-metal or tri-metal material of the present invention is not limited to such a hollow conical frustum shape. Various other shapes such as, e.g., a pyramidal frustum, may be used instead. Further, while a stopper 230 made of rubber is used in the embodiment shown in FIGS. 2A-2C, the stopper 230 may be made of other materials such as, e.g., synthetic or naturally occurring polymers, plastics, or steels etc.

As the above-described thermal switch 112, 212 can be configured such that they operate based on a roof temperature Tr, a cabin temperature Tc, comparison between the roof and cabin temperatures (e.g., Tr≥Tc or Tr<Tc), or any combination thereof, no separate controller (or a processor or a computer including a CPU) is needed to operate the thermal switch 112, 212 (i.e., autonomously operable without the need for a controller). However, it is also contemplated that the above-described switch 112, 212 and/or the cabin cooling system 104, 204 may be operated in combination (or cooperation) with a controller or other vehicular system(s). The dimensions of an individual switch and the total number of thermal switches to be installed in a vehicle can vary depending on the size and/or design of the vehicle. For example, the total number of thermal switches installed in a vehicle may range from, e.g., 1 to 300 switches.

According to the first exemplary embodiment of the invention, one or more thermal switches (preferably bi-metal or tri-metal switches) 112, 212 are installed at one or more corresponding discontinuities of the insulation layer disposed between the roof and the cabin. Due to displacement of the bi-metallic or tri-metallic strips or planar members dependent on a roof temperature Tr and a cabin temperature Tc, the thermal switches are autonomously switched between an open position and a closed position according to the intended design of the switches 112, 212. In this way, a cold roof can be used to cool down the cabin when needed.

Figure 3A:
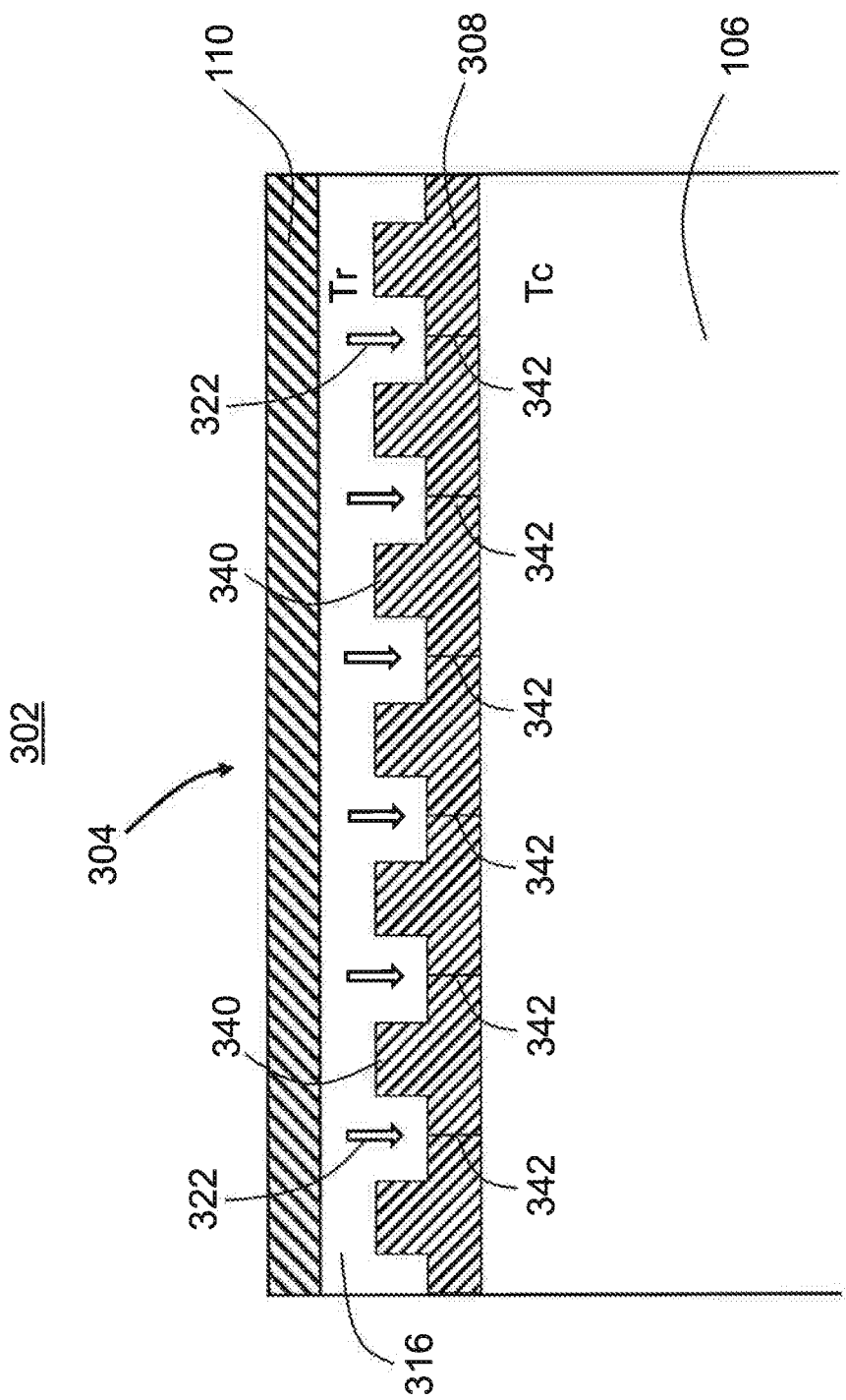
FIG. 3A is a schematic view of a cabin cooling system including an insulation layer made of a porous material with a negative coefficient of thermal expansion when a cabin temperature is lower than a threshold temperature in accordance with a second exemplary embodiment of the present invention.
Figure 3B:
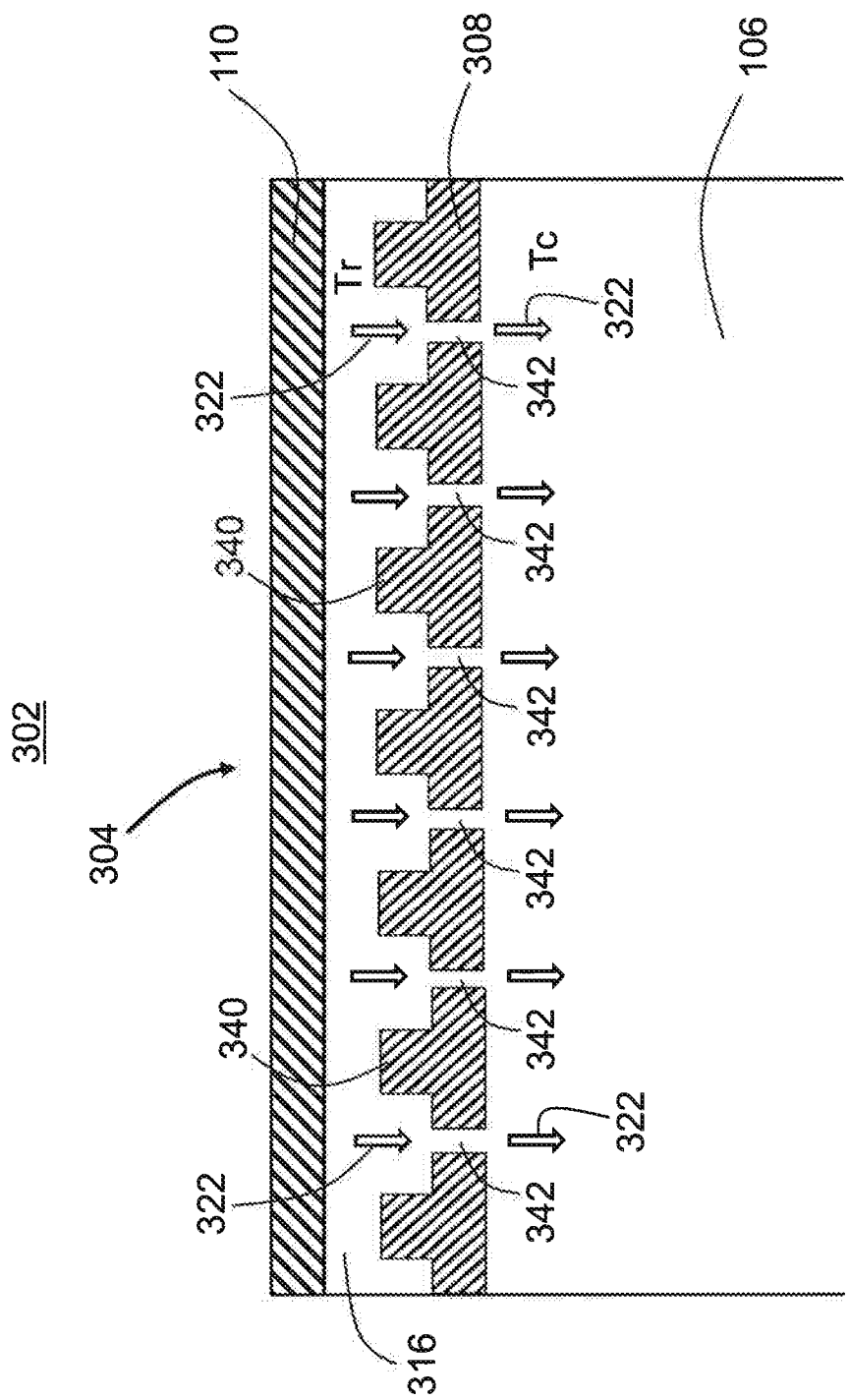
FIG. 3B is a schematic view of the cabin cooling system including the insulation layer made of the porous material when a cabin temperature is equal to or higher than a threshold temperature.

FIGS. 3A-3B schematically illustrate a cabin cooling system 304 of a vehicle 302 using a cold vehicular roof 110 in accordance with a second exemplary embodiment of the present invention. Again, a "cold" roof means that the roof is relatively cooler than the cabin, or the roof temperature Tr is lower than the cabin temperature Tc. The roof temperature Tr or the cabin temperature Tc may be measured via, e.g., a sensor such as a temperature sensor (not shown).

In particular, FIGS. 3A-3B schematically show a cabin cooling system 304 which includes an insulation layer 308 that is entirely made of a single porous material with a negative coefficient of thermal expansion. Specifically, FIG. 3A illustrates the cabin cooling system 304 when a cabin temperature Tc is lower than a threshold temperature Tth (i.e., Tc<Tth). On the other hand, FIG. 3B illustrates the cabin cooling system 304 when the cabin temperature Tc is equal to or higher than the threshold temperature Tth (i.e., Tc≥Tth). The cabin temperature Tc may be measured at a location inside the cabin 106. Alternatively, the cabin temperature Tc may be measured on a ceiling, a wall, or a bottom of the cabin 106.

According to the second embodiment, the insulation layer 308 is preferably made of a porous material with a negative coefficient of thermal expansion. Materials having a negative coefficient of thermal expansion contract, rather than expand as their temperature increases. Exemplary materials showing negative thermal expansion are, e.g., $Cu_2O$, $ZrW_2O_8$, beta-quartz, and some zeolites. The porous material of the insulation layer 308 may include a plurality of pores 342. A gap 316 is present between the roof 110 and the insulation layer 308 in the embodiment shown in FIGS. 3A-3B. However, no gap may be present in other embodiments.

In the exemplary embodiment shown in FIGS. 3A-3B, the insulation layer 308 includes a plurality of sub-parts 340 each of which is of upside-down mushroom-shape when viewed from the side. However, the shape of the insulation layer 308 of the present invention is not limited to such an upside-down mushroom-shape. The insulation layer 308 may have a different shape such as e.g., a cone shape.

Unlike the first embodiment, the second embodiment does not employ a thermal switch to switch a passage between an open mode and a closed mode. Instead, a plurality of pores 342 of the insulation layer 308 are utilized to switch a passage 322 (as indicated with arrows) between an open mode (shown in FIG. 3B) and a closed mode (shown in FIG. 3A). The passage 322 fluidly couples the roof 110 with the cabin 106 when the pores 342 are open (shown in FIG. 3B). As a result, cooled air due to the cold roof 110 can travel into the cabin 106, thereby cooling down the cabin temperature Tc. In this way, heat transfer occurs between the roof 110 and the cabin 106.

The porous material with a negative coefficient of thermal expansion is configured such that when the cabin temperature Tc is lower than a threshold temperature Tth (i.e., Tc<Tth), the porous material (or the insulation layer 308) expands (or starts expanding) to a closed position and the passage 322 is switched to a closed mode because the plurality of pores 342 of the insulation layer 308 are closed, as shown in FIG. 3A. On the other hand, when the cabin temperature Tc is equal to or higher than a threshold temperature Tth (i.e., Tc≥Tth), the porous material (or the insulation layer 308) contracts (or arts contracting) to an open position and the passage 322 is switched to an open mode because the plurality of pores 342 of the insulation layer 308 are open, as shown in FIG. 3B.

Figure 3C:
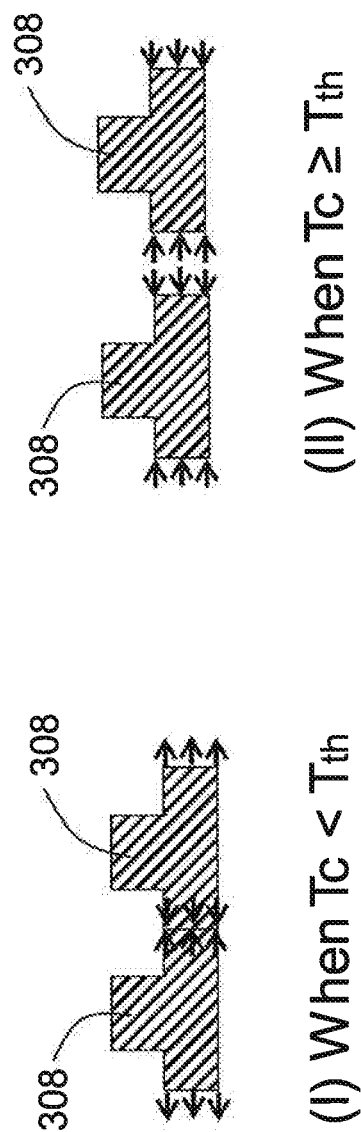
FIG. 3C is an enlarged view of the porous material with a negative coefficient of thermal expansion which schematically illustrates expansion and contraction of the porous material.

FIG. 3C is an enlarged view of the porous material (or the insulation layer 308) with a negative coefficient of thermal expansion, which schematically illustrates expansion and contraction of the porous material (or the insulation layer 308) as the cabin temperature Tc changes. Specifically, FIG. 3C(I) schematically illustrates expansion of the porous material (or the insulation layer 308) to a closed position when the cabin temperature Tc is lower than a threshold temperature Tth (i.e., Tc<Tth). FIG. 3C(II) schematically illustrates contraction of the porous material (or the insulation layer 308) to an open position when the cabin temperature Tc is equal to or higher than a threshold temperature Tth (i.e., Tc≥Tth). Due to the expansion or contraction of the porous material (or the insulation layer 308), the plurality of pores 342 switch between a closed position (shown in FIG. 3A) and an open position (shown in FIG. 3B).

In the exemplary embodiment shown in FIGS. 3A-3B, the insulation layer 308 is made of a single porous material with a negative coefficient of thermal expansion. However, in other embodiments, the insulation layer 308 may be made of a plurality of porous materials, with either an identical or different coefficient of thermal expansion. Further, unlike the embodiment shown in FIGS. 3A-3B in which the entire insulation layer 308 is made of a porous material, in other embodiments, only a portion of the insulation layer 308 may be made of one or more porous materials. For example, in some embodiments, only a central portion of the insulation layer 308 of FIGS. 3A-3B may be made of one or more porous materials and the other areas of the insulation layer 308 may be made of non-porous material(s).

Figure 3D:
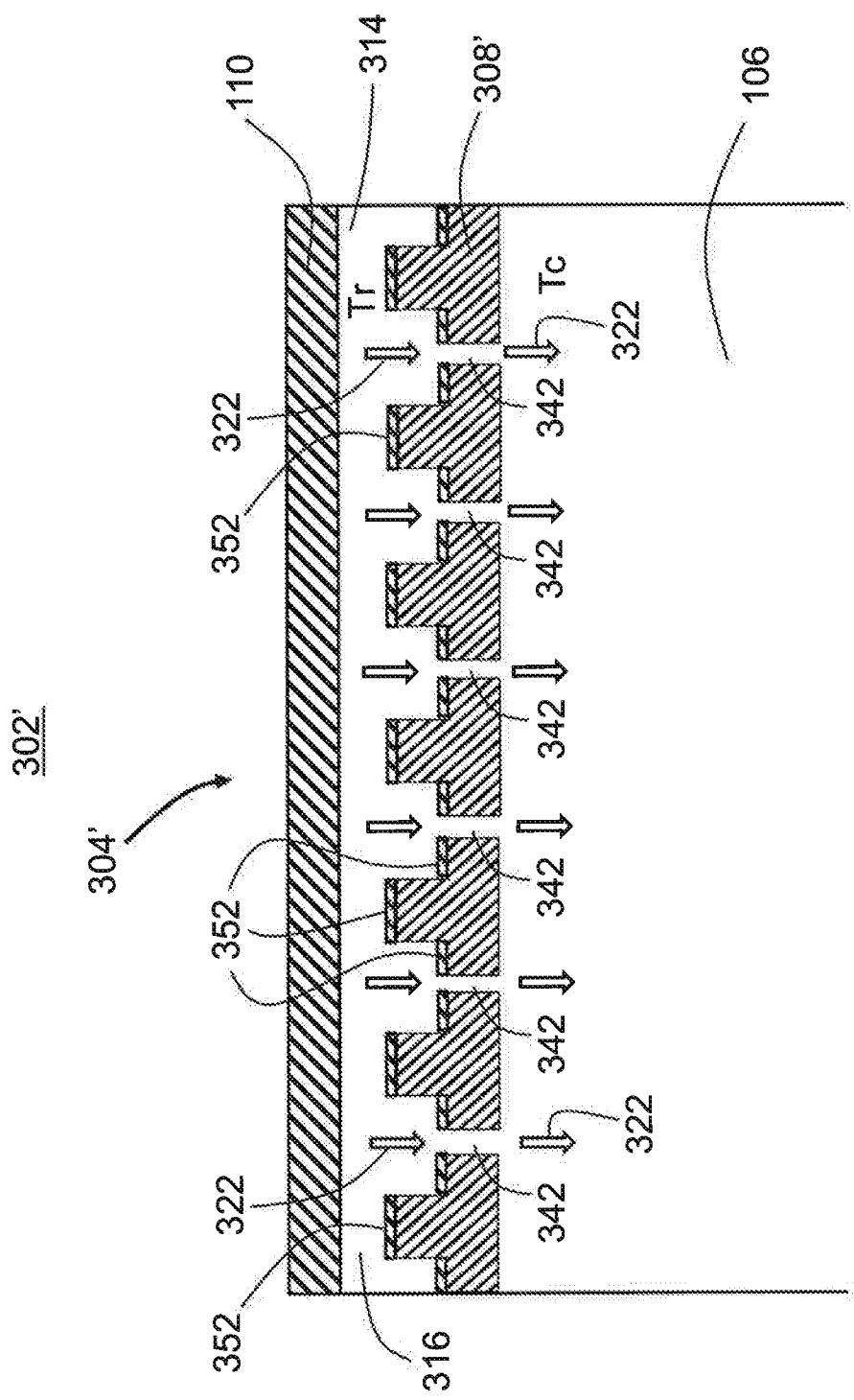
FIG. 3D is a view of a variant embodiment in which the insulation layer has an additional insulating layer on top of the porous material.

FIG. 3D shows a variant embodiment. A cabin cooling system 304' of a vehicle 302' shown in FIG. 3D differs from the embodiment of FIG. 3B in that the insulation layer 308' has an additional insulating layer 352 on top of the porous material on the side facing the roof 110. The additional insulating layer 352 may be in the form of e.g., sheet, foil, mesh, or fabric, etc. The additional insulating layer 352 may be provided to prevent or reduce heat transfer from the roof 110 to the insulation layer 308'. In this way, the insulation layer 308' can expand or contract easily depending on the cabin temperature Tc.

FIG. 3E shows a top view of an exemplary insulation layer 308" in accordance with the second exemplary embodiment of the present invention. As described above, the insulation layer 308" includes a plurality of pores 342". In this exemplary embodiment, each pore 342" is substantially of circular shape. However, in other embodiments, the pore 342" may have a different shape such as e.g., oval, triangular, rectangular, etc. The diameter D of each pore 342" and the distance L between adjacent pores may be used as design parameters depending on the cabin cooling system. Other design parameters may include the shape of pores, porous material, the thickness of the porous material, etc. The exemplary aspects described referring to FIG. 3E may be combined with one or snore of the above-described features referring to FIGS. 3A-3D.

While in the exemplary embodiments shown in FIGS. 3A, 3B, 3D, the porous material with a negative coefficient of thermal expansion is configured to expand or contract depending on the cabin temperature Tc. However, in other embodiments, it is contemplated that a porous material with a negative coefficient of thermal expansion is configured to expand or contract depending on the roof temperature Tr. In this case, the plurality of sub-parts 340 of the insulation layer 308 shown in FIGS. 3A-3B may be of normal mushroom-shape (instead of upside-down mushroom-shape) when viewed from the side, or the additional insulating layer 352 of the insulation layer 308' shown in FIG. 3D may be on the bottom of the porous material on the side facing the cabin 106.

As the above-described insulation layer 308, 308', 308" including a porous material with a negative coefficient of thermal expansion can be configured such that it operates based on a roof temperature, a cabin temperature, or any combination thereof, no separate controller (or a processor or a computer including a CPU) is needed for operation of the porous material (or the insulation layer 308, 308', 308") (i.e., autonomously operable without the need for a controller). However, it is also contemplated that the above-described porous material (or the insulation layer 308, 308', 308") and/or the cabin cooling system 304, 304' may be operated in combination (or cooperation) with a controller or other vehicular system(s).

According to the second exemplary embodiment of the invention, at least part of the insulation layer is made of a porous material with a negative coefficient of thermal expansion. Due to expansion or contraction of a plurality of pores of the porous material dependent on a roof temperature Tr or a cabin temperature Tc, the porous material is autonomously switched between an open position and a closed position according to the intended design of the porous material (or insulation layer). In this way, a cold roof can be used to cool down the cabin when needed.

Figure 4A:
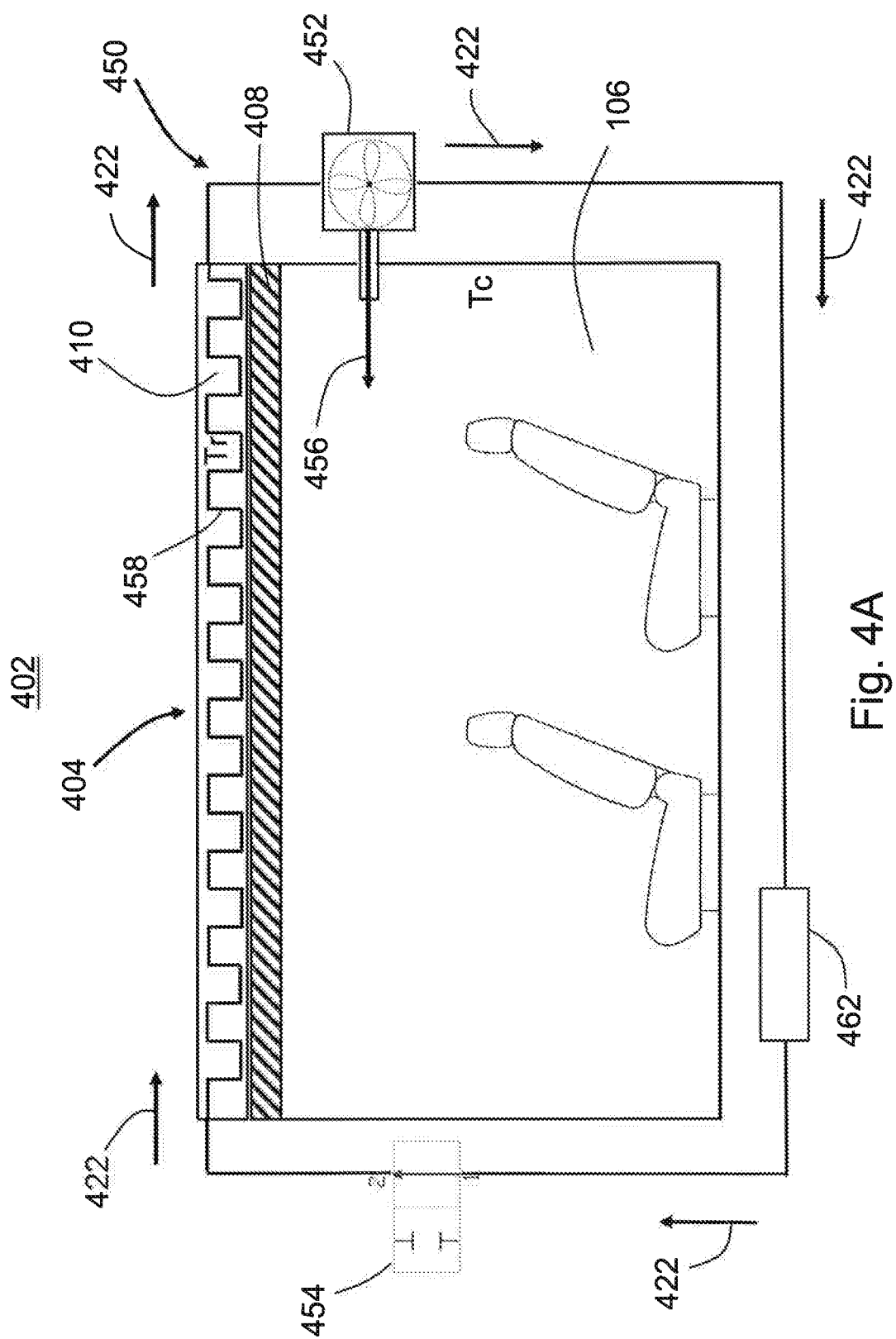
FIG. 4A is a schematic view of a cabin cooling system including a cooling circuit via which heat exchange between a roof and a cabin occurs when a roof temperature is lower than a cabin temperature and the cabin temperature is equal to or higher than a threshold temperature in accordance with a third exemplary embodiment of the present invention.

FIGS. 4A-4B schematically illustrate a cabin cooling system 404 of a vehicle 402 using a cold vehicular roof 410 in accordance with a third exemplary embodiment of the present invention. Again, a "cold" roof means that the roof is relatively cooler than the cabin, or the roof temperature Tr is lower than the cabin temperature Tc. The roof temperature Tr or the cabin temperature Tc may be measured via, e.g., a sensor such as a temperature sensor (not shown).

In particular, FIGS. 4A-4B schematically show a cabin cooling system 404 which employs a cooling circuit 450 via which heat exchange between the roof 410 and the cabin 106 occurs. The cooling circuit 450 may include a conduit 458, a blower 452, a valve 454, and a controller 462. The conduit 458 preferably runs through the cold roof 410. As illustrated in FIG. 4A, when the roof temperature Tr is lower than the cabin temperature Tc (i.e., Tr<Tc) and the cabin temperature Tc is equal to or higher than a threshold temperature Tth (i.e., Tc≥Tth), the passage 422 (as indicated with arrows) of the cooling circuit 450 is switched to an open mode by way of the valve 454 being switched to an open position. Here, the threshold temperature Tth may be, e.g., 18° C.

However, when the roof temperature Tr is equal to or higher than the cabin temperature Tc (i.e., Tr≥Tc), or the cabin temperature Tc is lower than a threshold temperature Tth (i.e., Tc<Tth), the passage 422 (shown in FIG. 4A) of the cooling circuit 450 is switched to a closed mode by way of the valve 454 being switched to a closed position, as illustrated in FIG. 4B.

The above-described switching operation between the open and closed modes of the cooling circuit 450 may be controlled by the controller 462 based on the roof and cabin temperatures Tr, Tc measured by temperature sensors (not shown). For example, in response to the detected roof temperature Tr being lower than the detected cabin temperature Tc (i.e., Tr<Tc) and the detected cabin temperature Tc being equal to or higher than a threshold temperature, e.g., 18° C. (i.e., Tc≥18° C.), the controller 462 commands that the cooling circuit 450 be opened allowing cooled air due to the cold roof 410 to travel into the cabin 106 cooling down the cabin temperature Tc. In this way, heat transfer occurs between the roof 410 and the cabin 106. To the contrary, in response to the detected roof temperature Tr being equal to or higher than the cabin temperature Tc (i.e., Tr≥Tc), or the cabin temperature Tc is lower than a threshold temperature, e.g., 18° C. (i.e., Tc<18° C.), the controller 462 commands that the cooling circuit 450 be closed off, thereby preventing heat transfer between the roof 410 and the cabin 106.

In the cooling circuit 450, a fluid (e.g., air) may flow in the conduit 458 such that cooled air due to the cold roof 410 may be blown into the cabin 106 (as indicated by an arrow 456) by the blower 452. However, the cooling circuit of the present invention is not limited to the above-discussed cooling circuit 450. Any type of cooling circuit via which heat exchange between the cold roof 410 and the cabin 106 can occur may be utilized without departing from the spirit and scope of the present invention.

Unlike the first and second exemplary embodiments, the passage 422 of the cooling circuit 450 (or the cabin cooling system 404) does not run through the insulation layer 408. Instead, the passage 422 runs around the insulation layer 408 as shown in FIG. 4A. That is, the passage 422 extends outside of the insulation layer 408 fluidly coupling the roof 410 with the cabin 106. The passage 422 may be part of the cooling circuit 450 and preferably run, at least in part, through the roof 410. Alternatively, the passage 422 may run, at least in part, on the roof 410 in other embodiments.

A controller (or ECU) in the present invention, including the above-described controller 462, may be implemented by software, hardware, or a combination thereof. The controller may include a microprocessor or central processing unit (CPU) in communication with various types of non-transitory computer readable storage devices or media. Non-transitory computer readable storage devices or media may include volatile and nonvolatile storage in read-only memory (ROM) and random-access memory (RAM), for example. Computer-readable storage devices or media may be implemented using any of a number of memory devices such as PROMs (programmable read-only memory), EPROMs (electrically PROM), EEPROMs (electrically erasable PROM), flash memory, or any other electric, electronic, magnetic, optical, or combination memory devices capable of storing data, some of which represent executable instructions, used by the controller. The controller may communicate with other vehicular devices, including the above-described cooling circuit 450, via a wired or wireless protocol.

While the above-discussed first, second, and third embodiments of the present invention include distinctly different features from one another, it is contemplated that a vehicle may simultaneously employ the features from two or more different embodiments. For example, a vehicle may include a first cabin cooling system according to the first exemplary embodiment for the front side of the vehicle, and a second cabin cooling system according to the second exemplary embodiment for the rear side of the vehicle.

Figure 5:
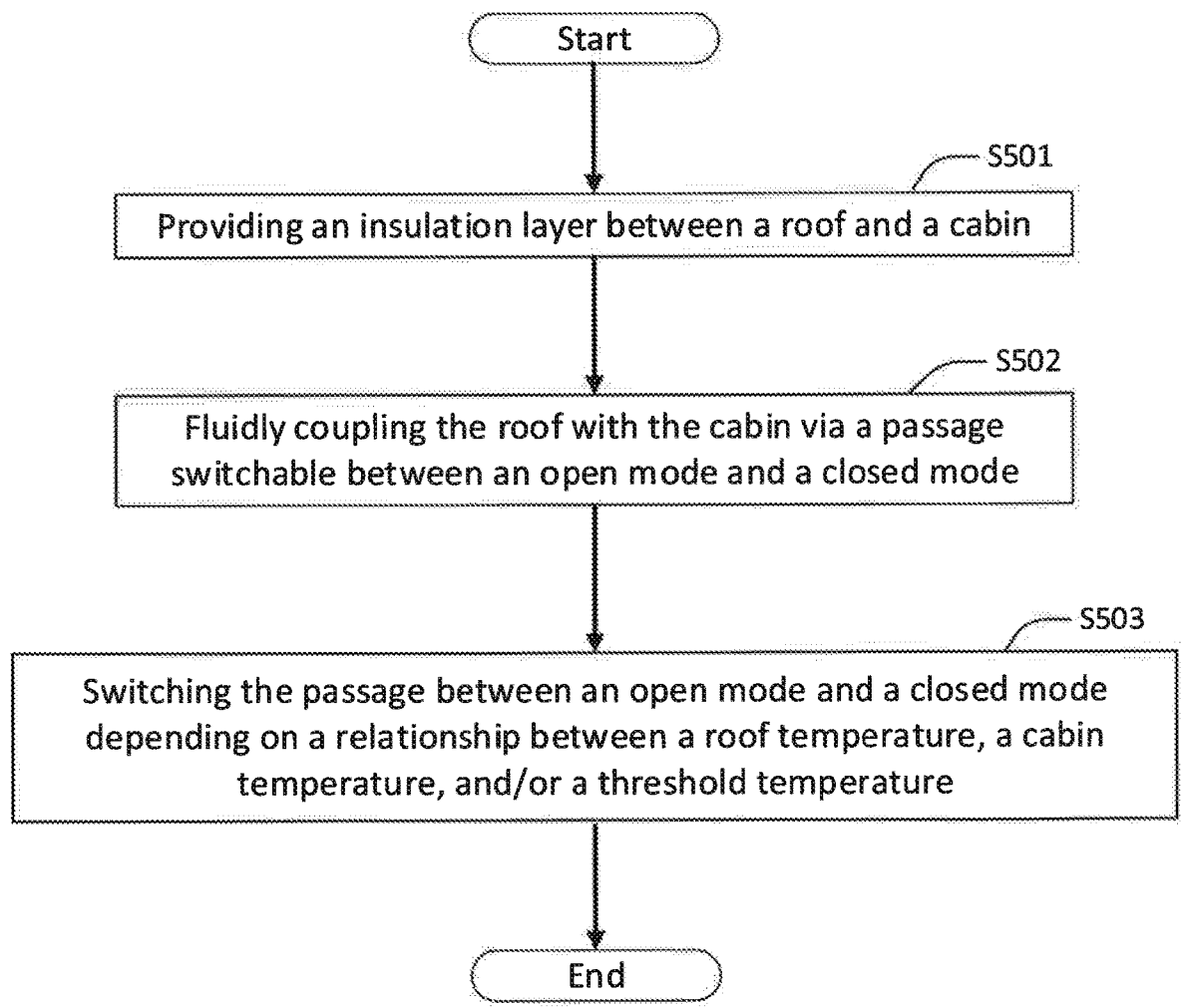
FIG. 5 is a flow chart that shows a process of cooling a cabin using a cold roof of a vehicle.
Figure 6:
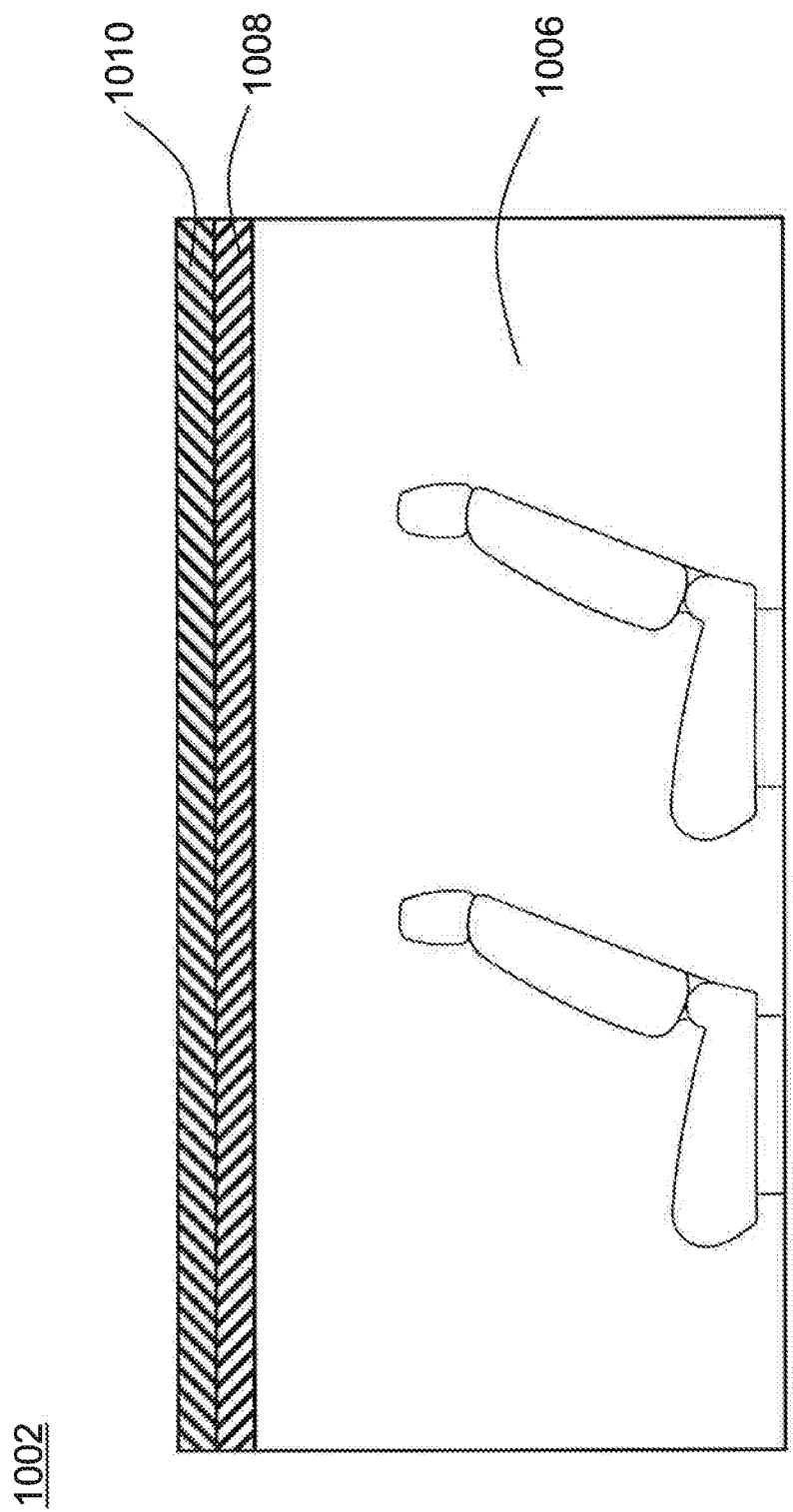
FIG. 6 is a schematic view of a vehicular cabin in a conventional vehicle.

Next, methods for cooling a cabin using a cold roof of a vehicle are explained. FIG. 5 is a flow chart that shows a process of cooling a cabin using a cold roof of a vehicle. Again, a "cold" roof means that the roof is relatively cooler than the cabin, or the roof temperature Tr is lower than the cabin temperature Tc. First, an insulation layer 108, 308, 408 is provided between a roof 110, 410 and a cabin 106 (step S501). The roof 110, 410 is fluidly coupled with the cabin 106 via a passage 122, 322, 422 which is switchable between an open mode and a closed mode (step S502). In particular, switching the passage 122, 322, 422 between the open mode and the closed mode may occur by way of a bi-metal or tri-metal switch 112, 212, an insulation layer 308, 308', 308" at least in part made of a porous material with a negative coefficient of thermal expansion, or a cooling circuit 450 which runs at least in part through or on the roof 410. The passage 122, 322, 422 is switched between an open mode and a closed mode depending on a relationship between the roof temperature Tr, the cabin temperature Tc, and/or the threshold temperature Tth (e.g., 18° C.) (step S503).

As explained referring to FIG. 2B above, in the case of using the bi-metal or tri-metal switch, the switch 212 may be designed such that when the cabin temperature Tc or the roof temperature Tr is within a predefined temperature range (e.g., Tr<18° C.), the switch is bent or moved toward and compressing the stopper 230 (e.g., rubber stopper). In this way, sealing between the switch 212 and the rubber stopper 230 can be improved.

It should be noted that the above-described features, referring to FIGS. 1A through 4B, related to a vehicle including a cabin cooling system according to various embodiments are also applicable to methods for cooling a cabin using a cold roof of a vehicle. Accordingly, a detailed description thereof will be omitted for brevity.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a roof;
   a cabin;
   an insulation layer disposed between the roof and the cabin, wherein the insulation layer functions as a barrier between the roof and the cabin;
   a passage disposed through the insulation layer and formed by a discontinuity in the insulation layer, wherein the passage couples the roof with the cabin, the passage being switchable between an open mode and a closed mode by a switch disposed at the discontinuity, wherein the switch is a bi-metal or tri-metal strip,
   wherein the passage is switched between the open mode and the closed mode by the switch,
   wherein the switch is operable based on comparison between a roof temperature and a cabin temperature,
   wherein no cooling circuit runs through or on the roof,
   wherein the switch is configured such that when the roof temperature is lower than the cabin temperature and the cabin temperature is equal to or higher than a threshold temperature, the passage is switched to the open mode to fluidly couple the roof with the cabin.

2. The vehicle according to claim 1, further comprising:
a rubber stopper, wherein
in the closed mode, the switch is in contact with the rubber stopper to seal a gap between the rubber stopper and the switch.

3. The vehicle according to claim 2, wherein the switch is configured such that at a predefined range of the cabin temperature or the roof temperature, the switch is bent or moved toward the rubber stopper to seal the cabin from the roof.

4. The vehicle according to claim 2, wherein
the rubber stopper includes a cylindrical body.

5. A method of cooling a cabin of a vehicle using a cold temperature of a roof, wherein an insulation layer is arranged between the roof and the cabin and wherein the insulation layer functions as a barrier between the roof and the cabin, the method comprising the acts of:
providing a passage coupling the roof with the cabin which is disposed through the insulation layer and formed by a discontinuity in the insulation layer and which is switchable between an open mode and a closed mode by a switch disposed at the discontinuity, wherein the switch is a bi-metal or tri-metal strip; and
switching the passage to the open mode by the switch when a temperature of the roof is lower than a temperature of the cabin and the cabin temperature is equal to or higher than a threshold temperature to fluidly couple the roof with the cabin,
wherein no cooling circuit runs through or on the roof.

6. The method according to claim 5, wherein in the closed mode, the switch is in contact with a rubber stopper to seal a gap between the rubber stopper and the switch.

* * * * *